United States Patent [19]
Greenwood

[11] 3,945,401
[45] Mar. 23, 1976

[54] COMBINATION VALVE

[75] Inventor: Roger Greenwood, North Hollywood, Calif.

[73] Assignee: International Telephone & Telegraph Corporation, New York, N.Y.

[22] Filed: Sept. 16, 1974

[21] Appl. No.: 506,259

Related U.S. Application Data

[60] Division of Ser. No. 461,743, April 17, 1974, which is a division of Ser. No. 359,653, May 14, 1973, which is a continuation-in-part of Ser. No. 217,539, Jan. 13, 1972, abandoned.

[52] U.S. Cl. ............................................ 137/627.5
[51] Int. Cl.² ......................................... F16K 31/12
[58] Field of Search .............. 137/627.5; 303/40, 54

[56] References Cited
UNITED STATES PATENTS

| | | | |
|---|---|---|---|
| 2,985,490 | 5/1961 | Gates | 303/40 |
| 3,003,825 | 10/1961 | Kemble | 303/54 |
| 3,115,371 | 12/1963 | Valentine | 303/40 UX |
| 3,752,190 | 8/1973 | Brake | 137/627.5 |

*Primary Examiner*—Robert G. Nilson
*Attorney, Agent, or Firm*—A. Donald Stolzy

[57] ABSTRACT

A quick acting three-way valve that operates a poppet with a lost motion connection. A sleeve is sealed through the diaphragm. A solid or hollow sleeve may be employed with a hollow or solid poppet, respectively. If either the sleeve or the poppet is hollow, the other may or may not be, as desired. An exhaust port is provided in communication with either one or both of the hollow interiors of the sleeve and poppet, the exhaust port being provided through the valve body.

3 Claims, 5 Drawing Figures

3,945,401

COMBINATION VALVE

BACKGROUND OF THE INVENTION

This application is a division of copending application Ser. No. 461,743 filed Apr. 17, 1974, for COMBINATION VALVE, the said copending application Ser. No. 461,743 being a division of copending application Ser. No. 359,653 filed May 14, 1973 for COMBINATION VALVE, the said copending application Ser. No. 359,653 being a continuation-in-part of abandoned application Ser. No. 217,539 filed Jan. 13, 1972 for DIAPHRAGM VALVE AND COMPONENTS THEREOF. The benefit of the filing dates of all of the aforesaid applications is hereby claimed for this application.

Reference is hereby made to the declaration filed under 35 C.F.R. 1.131 in said application Ser. No. 359,653.

This invention relates to fluid flow control apparatus, and more particularly, to three-way valves or the like which may be used as dump valves or other valves in anti-skid brake control or other systems of a similar or different type.

In the past, quick acting diaphragm-operated poppet valves have been used to advantage where a lost motion connection has been provided between the diaphragm and the poppet. For example, see copending application Ser. No. 108,873 filed Jan. 22, 1971, by R. D. Grayson, R. A. Palmer and R. J. Fox for PRESSURE SENSITIVE CONTROL APPARATUS.

It is also old in the art to provide a diaphragm stem with a passageway therethrough for operation of a valve fixed to the stem without a lost motion connection therebetween. See U.S. Pat. No. 3,238,323.

Notwithstanding the foregoing, the prior art has not provided a suitable diaphragm-operated, three-way valve.

SUMMARY OF THE INVENTION

In accordance with the device of the present invention, a quick acting three-way valve is provided which may be operated by a diaphragm or other means.

One outstanding feature of the present invention resides in the use of a valve body having a vented passageway either in a diaphragm or other stem or in a valve poppet or in both.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
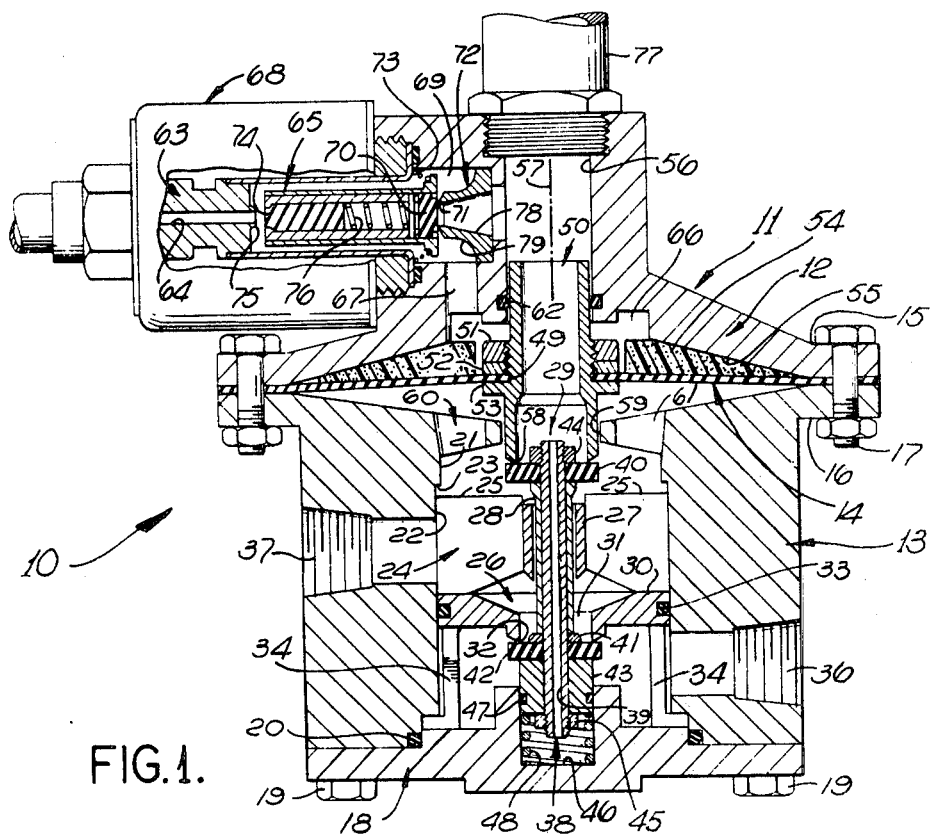
FIG. 1 is a vertical sectional view of a diaphragm valve constructed in accordance with the present invention.

In the drawing, in FIG. 1, a diaphragm valve of the present invention is indicated at 10 having a body 11. Body 11 includes a bonnet 12 and a base portion 13. A diaphragm 14 has its edge fixed between circular flanges 15 and 16 of bonnet 12 and base portion 13, respectively, by bolts 17. Body 11 also includes a lower end plate 18 which is fixed to base portion 13 by cap screws 19. End plate 18 is sealed to base portion 13 by an O-ring 20.

Figure 2:
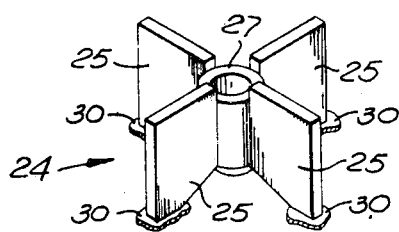
FIGS. 2 and 3 are perspective views of two different, but integrally die cast and machined, spiders employed in the valve of FIG. 1.
Figure 3:
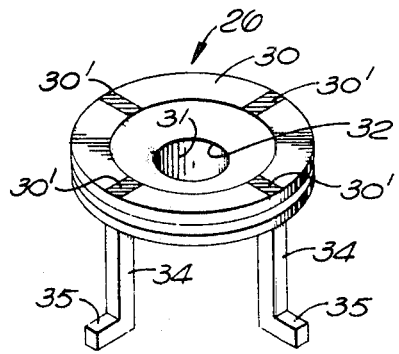

Base portion 13 has a cylindrical bore 21 and a counterbore 22 slightly larger than bore 21 reaching a shoulder at 23. Valve 10 includes a spider 24 that has vanes 25 integral with a plate 30 of a spider 26 at 30' in FIG. 3. See both of FIGS. 2 and 3. Vanes 25 are integral with a cylinder 27 through which a sleeve 28 of a poppet 29 is slidable. See FIGS. 1 and 2. Spider 24 is shown in FIG. 2. Spider 26 is shown in FIG. 3 including plate 30 having a hole 31 therethrough surrounded by a valve seat 32, as shown in FIG. 1. Plate 30 is sealed to bore 22 by an O-ring 33. Spider 26 also has four legs 34 with feet 35 integral therewith. Legs 34 are integral with plate 30. Feet 36 are clamped between base portion 13 and plate 18. Base portion 13 has an inlet port 36, and an outlet port 37. Two or more outlet ports 37 may be provided, if desired. Typically, air under a pressure of 130 pounds per square inch may be supplied through inlet port 36.

Poppet 29 includes a hollow tube 38 having a passageway 39 extending completely therethrough. A valve disc 40 is positioned around tube 38 above sleeve 28. A washer 41, a valve disc 42 and a member 43 are positioned in succession around tube 38 below sleeve 28. A nut 44 is threaded onto the exterior of the upper end of tube 38. A nut 45 is threaded onto the exterior of the lower end of tube 38. Nuts 44 and 45 are, thus, tightened. This places tube 38 in tension, and it places all the structures therearound in compression.

Plate 18 has a recess 46 therein which is cylindrical. Member 43 is likewise cylindrical. Member 43 is, thus, slidable in recess 46. An O-ring 47 provides a fluid tight seal between member 43 and recess 46. A helically coiled spring 48 is positioned in recess 46 to bias poppet 29 to its uppermost position as shown in FIG. 1.

Diaphragm 14 has a circular hole 49 therethrough. A sleeve 50 is fixed through hole 49 to diaphragm 14 by a nut 51 threaded to sleeve 50. Nut 51 presses a washer 52 against diaphragm 14, and diaphragm 14 against a flange 53 integral with sleeve 50.

A frusto-conical polyurethane sponge 54 is positioned between the upper side of diaphragm 14 and a mating frusto-conical surface 55 of bonnet 12. Sponge 54 may or may not be bonded to either diaphragm 14 or bonnet 12, as desired. However, if bonding is desired, preferably, sponge 54 is bonded to surface 55 and not to diaphragm 14. Bonnet 12 has a bore 56. Bore 56 has a cylindrical surface. The cylindrical surface of bore 56 has an axis 57. If desired, many parts of this construction shown in FIG. 1 may be symmetrical about axis 57, as shown.

As can be seen in FIG. 1, disc 42 acts as a valve which seals off hole 31 by engaging valve seat 32. Similarly, disc 40 seals off the hollow interior of sleeve 50 by engaging a valve seat 58 at the lower end thereof.

The lower end of sleeve 50 is guided through a cylindrical opening 59 through a spider 60 integral with base portion 13 having, for example, eight holes 61 therethrough.

Sleeve 50 is also slidably guided in bore 56. An O-ring 62 provides a fluid tight seal between the external surface of sleeve 50 and bore 56.

A body 63 is fixed relative to body 11. Body 63 has an inlet passageway 64. Air is admitted to passageway 64 in accordance with brake pedal pressure, as is conventional. This pressure may vary, for example, from 0 to 100 pounds per square inch. Air through passageway 64, when plunger 65 is in the positon shown, may enter a space 66 above diaphragm 14 through a cylindrical port 67 in bonnet 12. Air can arrive at port 67 because plunger 65 is loosely retained inside a solenoid housing 68. Air exiting from passageway 54 to the right, as viewed in FIG. 1, may thus flow around plunger 65 to a space 69 to the right thereof, and into the port 67. Plunger 65 has a valve disc 70 which is biased into engagement with a seat 71 on a fitting 72 by a coiled spring 73. Fitting 72 is fixed to and sealed to bonnet 12. A valve 74 is capable of resting on a valve seat 75 on body 63. A spring 76 normally biases valve 74 to the position shown in FIG. 1, but allows it to remain substantially on seat 75 while the remainder of plunger 65 moves to the left a small amount.

One outstanding advantage of the present invention resides in the use of the sponge 54. This construction permits faster dumping. That is, air in space 66 may be vented to the atmosphere quickly from brake cylinders connected with port 37 through sleeve 50 through bore 56 and through a vent valve 77.

Faster dumping is also obtained by employing the frusto-conical internal surface 78 of fitting 72, as shown in FIG. 1. The same is true of the tangency of the external surface 79 to the internal surface of port 67.

OPERATION

In the operation of the embodiment of the invention shown in FIG. 1, diaphragm 14 may be in the position shown. Diaphragm 14 is flexible and may or may not be made of rubber or a rubber-like material. Sponge 54, by definition, has at least some resilience to recover its shape. When brake pedal pressure is applied, pressure is supplied through passageway 64, and diaphragm 14 moves downwardly. This keeps disc 40 in sealing engagement with seat 58 but pushes disc 48 away from seat 32. The pressure in inlet 36 is then allowed to enter the brake cylinders through port 37. As soon as the pressure below diaphragm 14 becomes equal to the pressure thereabove, disc 42 again engages seat 32. As the pressure in passageway 64 is vented to atmosphere, the pressure below diaphragm 14 will exceed that in space 66. Diaphragm 14 will then lift seat 58 off of disc 40, and the space below diaphragm 14 will be vented to atmosphere through sleeve 50, bore 56 and vent valve 77.

Now assume again that brake pedal pressure is applied and pressure is supplied through passageway 64. In the meantime, the anti-skid brake control system calls for a release of brake pressure by the energization of the solenoid 58. In this case, valve 74 will close against seat 75, and disc 70 will move away from seat 71. Air under pressure in space 66 will then be vented to atmosphere through port 67, through the hole in fitting 72, into bore 56 and outwardly of vent valve 77. Diaphragm 14 will then move up and lift seat 58 off of disc 40, and vent the space below diaphragm 14 to the atmosphere, as before, through sleeve 50, bore 56 and vent valve 77.

As stated previously, the use of sponge 54 increases the dumping rate. This is the rate at which the pressure is reduced below diaphragm 14 when seat 58 is lifted off of disc 40. However, the dumping rate, during computer control of solenoid 68, is also dependent upon the rate at which the pressure in space 66 is dumped through point 67, through fitting 72, through bore 56 and through vent valve 77. That is the reason that the shape of surface 78 and the tangency of surface 79 with the surface of point 67 are important.

It is an advantage of the poppet 29 that recess 46 is vented to atmosphere through vent valve 77. Vent valve 77 keeps the interior of the valve 10 clean and free from contaminants external thereto; i.e. dirt, etc. Thus, by venting recess 46 through vent valve 77, it is possible to keep recess 46 clean without the need for additional check valve or vent valve means.

Note will be taken that venting of recess 46 through passsageway 39 is necessary because O-ring 47 provides a seal, and the size of the space in recess 46 is variable with the position of poppet 29. Such an air tight space would inhibit the operation of poppet 29, were not recess 46 vented.

Notwithstanding the foregoing, some embodiments of the invention have utility when a sponge is or is not employed. This is true of both of the valves 10 and 10'.

By this reference hereto, said copending application Ser. No. 217,539 is hereby incorporated herein as though fully set forth herein hereat.

Figure 4:
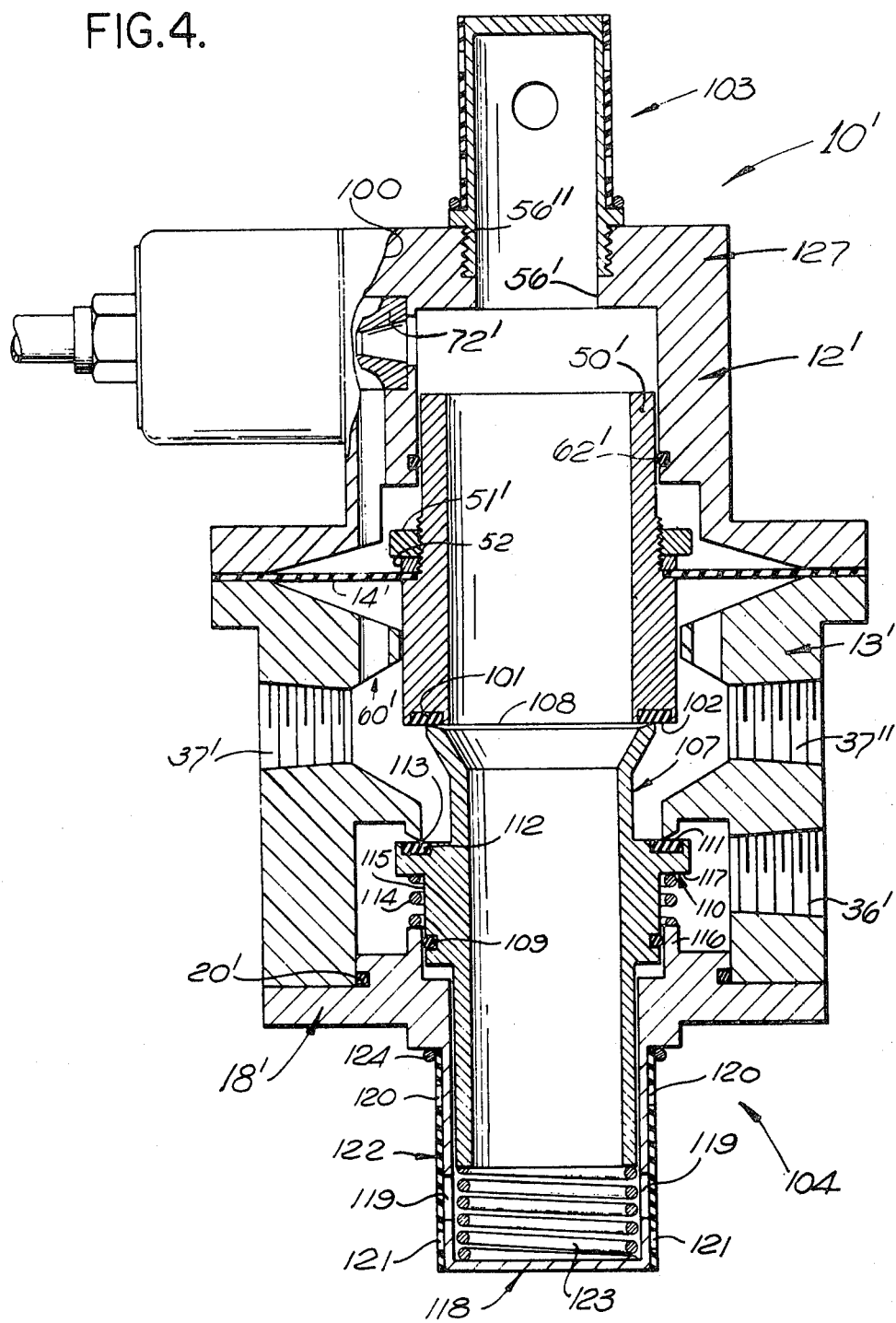
FIG. 4 is a vertical sectional view of a valve constructed in accordance with the present invention.

In FIG. 4 a diaphragm valve 10' constructed in accordance with the present invention has a bonnet 12', a base portion 13' and a lower end plate 18'. Valve 10' is cut away along a line 100. Valve 10' may be identical to valve 10 shown in FIG. 1 to the left of the line 100 shown in FIG. 4, if desired.

In FIG. 4, a diaphragm is illustrated at 14'.

Parts 12', 13', 18', 14', 50', 51', 52', 62' and 72' shown in FIG. 4 may be similar to parts 12, 13, 18, 14, 50, 51, 52, 62 and 72 shown in FIG. 1, respectively. In some instances, a part shown in FIG. 4 may be identical to the corresponding part shown in FIG. 1.

Base portion 13' has two outlet ports 37' and 37''.

A spider 60' shown in FIG. 4 may be similar to or identical to spider 60 shown in FIG. 1.

Sleeve 50' in FIG. 4 may be similar to or identical to sleeve 50 in FIG. 1 except for an annular groove 101 in the lower end of sleeve 50' in which a valve seat 102 is sealed and fixed.

Bonnet 12' in FIG. 4 has a bore 56' which may be similar to or identical to bore 56 shown in FIG. 1. Air is exhausted through bore 56', as before. A vent valve 103 covers the upper end of bore 56'. A similar vent valve 104 is mounted on end plate 18'.

Vent valves 103 and 104 may be identical, if desired. Thus, only vent valve 104 will be described in detail.

Base portion 13' has an inlet port 36' which may be similar to or identical to inlet port 36 shown in FIG. 1.

A valve 107 having a hollow interior and being open at both ends, has a circular sharp upper edge 108 that engages valve seat 102. Valve 107 is sealed to end plate 18' by an O-ring 109. Valve 107 has an outwardly projecting radial flange 110 with an annular groove 112 therein. Groove 112 has a rubber ring 111 fixed and sealed in groove 112.

Base portion 13' has a downwardly extending sharp circular edge 113 which bears against and seals with ring 111.

A helically coiled spring 114 fits contiguous to a cylindrical external surface 115 of valve 107 and rests on an upwardly extending cylindrical projection 116 integral with end plate 18'.

Spring 114 then bears against the lower annular surface 117 of flange 110 and spring biases ring 111 against the circular edge 113.

An O-ring 20' provides a fluid tight seal between body portion 13' and end plate 18'.

Bonnet 12' and base portion 13' are fixed together with diaphragm 14' by means not shown. This means may include, for example, bolts similar to or identical to bolts 17 shown in FIG. 1. Base portion 13' and end plate 18' may be fixed together by cap screws similar to or identical to cap screws 19 shown in FIG. 1.

Bonnet 12' has an upper portion 127 at which location vent valve 103 is mounted.

In the practice of the embodiment of the invention illustrated in FIG. 4, at least one, but not necessarily both, of vent valves 103 and 104 are preferably employed. Both of the vent valves 103 and 104 need not be employed. Either one of the vent valves 103 and 104 may be omitted.

In FIG. 4, end plate 18' has an annular projection 128. Membrane 120 also has a groove 129 which fits over projection 128. Plate 124 clamps membrane 120 tightly against the lower end of boss 119 with annular groove 129 in membrane 120 fitted tightly over projection 128 of end plate 18'.

As shown in FIG. 4, vent valve 104 includes a hollow cylinder 118 which is integral with end plate 18'. Cylinder 118 has circular holes 119 therethrough which are not perfectly or partially aligned with circular holes 120 and 121 through a substantially cylindrical rubber sleeve 122 placed over the exterior of cylinder 118. If desired, cylinder 118 and sleeve 122 may have an interference fit.

A spring 123 fits between the lower end of cylinder 118 and the lower end of valve 107. Spring 114 may be omitted in all cases, if desired. When spring 114 is employed, spring 123 may be omitted.

A conventional hose clamp 124 may be employed to hold rubber cylinder 122 in a fixed position on cylinder 118. HOse clamp 124 may or may not be releasable, as desired.

Figure 5:
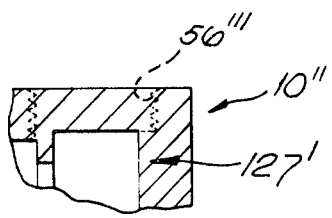
FIG. 5 is a sectional view of a portion of an alternative embodiment thereof.

In FIG. 5, a valve 10" is shown having a portion 127' similar to portion 127 shown in FIG. 4. Valve 10" may be identical to valve 10' except for the structure shown in FIG. 5. In FIG. 5, vent valve 103 has been omitted. Bore 56' has been filled solid. Thus, there are not longer threads at 56''' in FIG. 5, as illustrated at 56'' in FIG. 4.

Each of the vent valves 103 and 104 preferably are made similar to or identical to those described and/or illustrated in copending application Ser. No. 210,007 filed Dec. 20, 1971, by Roger Greenwood and Thomas Roberts for COMBINATION VALVE AND COMPONENT THEREOF. For this reason, by this reference hereto, said copending application Ser. No. 210,007 is hereby incorporated herein as though fully set forth herein hereat.

The word "impede," in any of its grammatical forms, is hereby defined for use herein and for use in the claims as including, but not being limited to, either a close fit of sleeve 50 in bore 56 in FIG. 1 with or without O-ring 62 or with both, but not necessarily both.

The word "poppet," the phrase "poppet assembly" and the phrase "poppet means" each are hereby defined for use herein and for use in the claims as including, but not being limited to, valve 107 and those structures which are substantially fixed relative thereto.

Both valves 10 and 10' shown in FIGS. 1 and 4, respectively, will operate adequately without sponge 54 in any of the same or different applications thereof.

Both valves 10 and 10' will operate adequately with sponge 54 in many of the same or different applications.

A phrase the same as or similar to "two or more portions fixed relative to each other" is hereby defined for use herein and for use in the claims as including, but not being limited to, two separate parts or two portions of the same part integral with each other.

The phrase "tube" is hereby defined for use herein and for use in the claims as including, but not being limited to, something having a passageway extending completely therethrough and which is open at both ends but which may or may not have a symmetrical axis of revolution and which may or may not have a uniform or partly uniform inside or outside diameter throughout its length.

Attention is hereby invited to all the prior art references cited in the said copending application Ser. No. 217,539.

The words "upper" and "lower" are hereby defined for use herein and for use in the claims to follow as designating *relative* positions of structures when the assembly thereof is turned to orient the parts a certain way. However, the words "upper" and "lower" are hereby defined in such a way that they do not limit any claim or the use of the invention to any one particular orientation.

The word "valve" is hereby defined for use herein and for use in the claims to include, but not be limited to, a fixed or movable valve made of rubber or metal or rubber or metal equivalents. The word "valve," as defined herein, thus may or may not be fixed or movable relative to a valve body or other structures.

The phrase "valve seat" is hereby defined for use herein and for use in the claims to include, but not be limited to, a fixed or movable valve seat made of rubber or metal or rubber or metal equivalents.

In accordance with the foregoing, the following combinations are possible, but the use of any particular one combination is not critical: A rubber or rubber equivalent valve seat may be used with a rubber or rubber equivalent valve. A metal or metal equivalent valve seat may be used with a metal or metal equivalent valve. However, preferably, but not necessarily, a rubber or rubber equivalent valve seat is employed with a metal or metal equivalent valve. Conversely, a metal or metal equivalent valve seat is preferably, but not necesssarily, employed with a rubber or rubber equivalent valve.

What is claimed is:

1. Fluid pressure responsive apparatus comprising: a hollow valve body having a flexible diaphragm sealed at its edge thereto, said valve body having a hollow interior divided into upper and lower pressure chambers by said diaphragm, said lower chamber including first and second spaces, said valve body having a cylindrical bore on one side of said diaphragm; a vent valve connected from said bore to the atmosphere, said bore having an axis, said diaphragm having a central hole therethrough symmetrical about said bore axis; a hollow cylindrical body fixed relative to and sealed relative to said diaphragm in a position extending through said diaphragm hole, said cylindrical body being located in a position slidable inside said bore concentric therewith; a first O-ring located around said cylindrical body in a position symmetrical about said axis, one of said bodies including means to trap said first O-ring in a substantially fixed position relative thereto, said first O-ring providing a fluid tight sliding seal between said bodies; a first spider fixed relative to said valve body internally thereof on the other side of said diaphragm, said first spider having a cylindrical hole therethrough, said cylindrical body also being slidable through said first spider hole, said first spider having other holes therethrough to admit fluid under pressure from said first space therebelow into said second space between said first spider and said diaphragm, said valve body having an outlet port in communication with said second space; a second spider fixed relative to said valve body internally thereof in a position sealed to the wall of said lower chamber, said lower chamber being located on the said other side of said diaphragm, said second spider generally dividing said second space from an inlet chamber in said valve body, said valve body having an inlet port in communication with said inlet chamber, said second spider having a circular hole therethrough concentric with and a valve seat therearound said bore axis; a poppet including upper and lower valve discs; means to guide movement of said poppet about and along said axis; a spring to bias said lower and upper valve discs against said second spider valve seat and the lower end of said cylinder body, respectively; selectively operable means to admit fluid under pressure to said upper chamber or to exhaust said upper chamber through said bore, said valve body being spaaced from said one diaphragm side; and a sponge-like layer positioned between said one diaphragm side and said valve body.

2. Fluid pressure responsive apparatus comprising: a hollow valve body having a flexible diaphragm sealed at its edge thereto, said valve body having a hollow interior divided into upper and lower pressure chambers by said diaphragm, said lower chamber including first and second spaces, said valve body having a cylindrical bore on one side of said diaphragm; a vent valve connected from said bore to the atmosphere, said bore having an axis, said diaphragm having a central hole therethrough symmetrical about said bore axis; a hollow cylindrical body fixed relative to and sealed relative to said diaphragm in a position extending through said diaphragm hole, said cylindrical body being located in a position slidable inside said bore concentric therewith; a first O-ring located around said cylindrical body in a position symmetrical about said axis, one of said bodies including means to trap said first O-ring in a substantially fixed position relative thereto, said first O-ring providing a fluid tight sliding seal between said bodies; a first spider fixed relative to said valve body internally thereof on the other side of said diaphragm, said first spider having a cylindrical hole therethrough, said cylindrical body also being slidable through said first spider hole, said first spider having other holes therethrough to admit fluid under pressure from said first space therebelow into said second space between said first spider and said diaphragm, said valve body having an outlet port in communication with said second space; a second spider fixed relative to said valve body internally thereof in a position sealed to the wall of said lower chamber, said lower chamber being located on the said other side of said diaphragm, said second spider generally dividing said second space from an inlet chamber in said valve body, said valve body having an inlet port in communication with said inlet chamber, said second spider having a circular hole therethrough concentric with and a valve seat therearound said bore axis; a poppet including upper and lower valve discs; means to guide movement of said poppet about and along said axis; a spring to bias said lower and upper valve discs against said second spider valve seat and the lower end of said cylindrical body, respectively; selectively operable means to admit fluid under pressure to said upper chamber or to exhaust said upper chamber through said bore, said selectively operable means including a fitting fixed relative to said valve body; said valve body having a circular hole with an axis transverse to said bore, said valve body hole extending from said fitting to said bore, said fitting being annular and concentric with said valve body hole axis, said fitting having a frustoconical internal surface of revolution about said valve body hole axis, said valve body hole axis being approximately perpendicular to said bore axis, the diameter of said fitting internal surface being the largest at the position of said valve body hole, said valve body having another cylindrical hole from said upper chamber to a space around said fitting, said fitting having a hollow, annular, tapering tip projecting transversely in front of said other valve body hole, said tip having an external surface of revolution which at one point lies tangent to the surface of said other valve body hole, said tip providing a valve seat at its end, said selectively operable means including a valve to seal with said tip seat.

3. Fluid pressure responsive apparatus comprising: a hollow valve body having a flexible diaphragm sealed at its edge thereto, said valve body having a hollow interior divided into upper and lower pressure chambers by said diaphragm, said lower chamber including first and second spaces, said valve body having a cylindrical bore on one side of said diaphragm; a vent valve connected from said bore to the atmosphere, said bore haaving an axis, said diaphragm having a central hole therethrough symmetrical about said bore axis; a hollow cylindrical body fixed relative to and sealed relative to said diahragm in a position extending through said diaphragm hole, said cylindrical body being located in a position slidable inside said bore concentric therewith; a first O-ring located around said cylindrical body in a position symmetrical about said axis, one of said bodies including means to trap said first O-ring in a substantially fixed position relative thereto, said first O-ring providing a fluid tight sliding seal between said bodies; a first spider fixed relative to said valve body internally thereof on the other side of said diaphragm, said first spider having a cylindrical hole therethrough, said cylindrical body also being slidable through said first spider hole, said first spider having other holes therethrough to admit fluid under pressure from said first space therebelow into said second space between said first spider and said diaphragm, said valve body having an outlet port in communication with said second space; a second spider fixed relative to said valve body internally thereof in a position sealed to the wall of said lower chamber, said lower chamber being located on the said other side of said diaphragm, said second spider generally dividing said second space from an inlet chamber in said valve body, said valve body having an inlet port in communication with said inlet chamber, said second spider having a circular hole therethrough concentric with said axis and a valve seat therearound; a poppet including upper and lower valve discs; means to guide movement of said poppet about and along said axis; a spring to bias said upper and lower valve discs against the lower end of said cylinder body and said spider valve seat, respectively; selectively operable means to admit fluid under pressure to said upper chamber or to exhaust said upper chamber through said bore, said second spider being fixed relative to said valve body inside thereof in said second space to guide said poppet, said valve body having a recess to slidably receive the lower end of said poppet, a second O-ring providing a sliding fluid tight seal between the lower end of said poppet and said recess, said poppet having a passageway extending completely therethrough to vent said recess to the interior of said cylindrical body.

* * * * *